(No Model.)
J. BARLOW.
FIXING WORKING POINTS OR ENDS OF PICKS, &c.
No. 576,535. Patented Feb. 9, 1897.
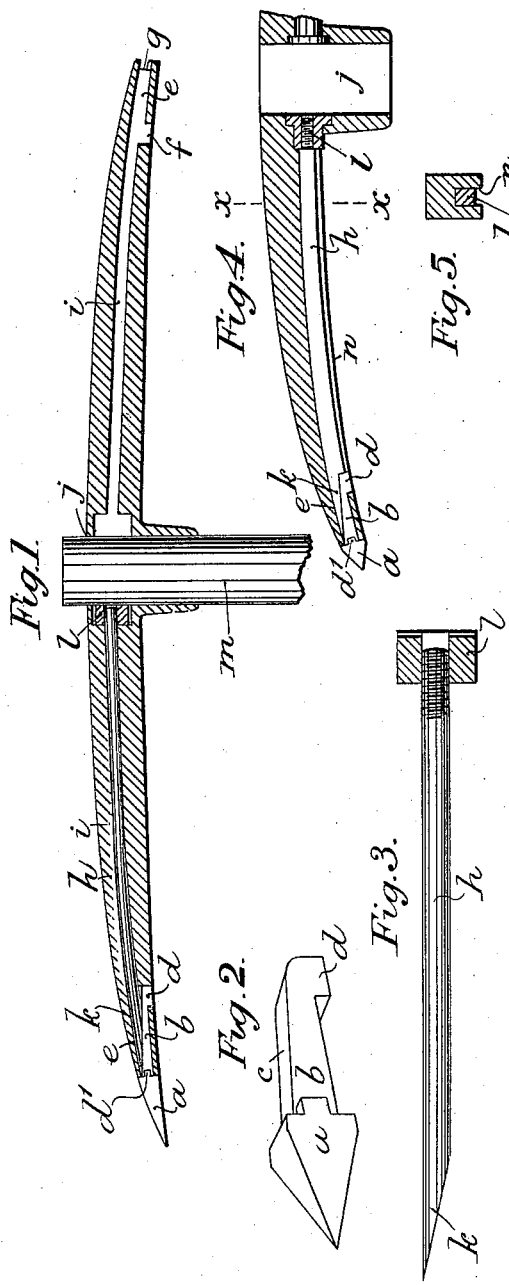

UNITED STATES PATENT OFFICE.

JOHN BARLOW, OF NOTTINGHAM, ENGLAND.

FIXING WORKING POINTS OR ENDS OF PICKS, &c.

SPECIFICATION forming part of Letters Patent No. 576,535, dated February 9, 1897.

Application filed July 11, 1896. Serial No. 598,848. (No model.)

*To all whom it may concern:*

Be it known that I, JOHN BARLOW, a subject of the Queen of Great Britain and Ireland, and a resident of Nottingham, England, have invented certain new and useful Improvements in Fixing the Working Points or Ends of Picks, Drills, &c., of which the following is a specification, reference being had to the accompanying drawings, forming a part thereof, in which similar letters of reference indicate corresponding parts.

My invention relates to an improved means of fixing removable working points or ends in picks and similar tools.

According to my invention the said points or ends are provided with wedge-shaped shanks fitting into and provided with means for engaging in sockets in the ends of the pick or like tool and secured in position by locking rods or bars, each having a tapered or wedge-shaped end fitting against the wedge-shaped shanks. Said locking rods or bars extend into the eye or hole for the shaft or handle, where they may be each provided with a nut against which the shaft or handle abuts and prevents any movement of the said rods or bars, but the rods or bars may be secured in any other convenient manner, although nuts are preferred. To prevent lateral twisting or other movement of the points or ends, the shanks thereof are provided with one or more projections adapted to be forced into corresponding holes, notches, or slots in the sockets by the tapered or wedge-shaped ends of the locking rods or bars; and in order that my invention may be readily understood I will describe the same fully with reference to the accompanying drawings, in which—

Figure 1 is a section of a navvy's pick constructed according to my invention, one of the points being removed. Fig. 2 is a perspective view of one of the removable working points, drawn to an enlarged scale. Fig. 3 is a detached view of one of the locking rods or bars for securing the points in position. Fig. 4 is a section showing a modification of my invention applied to a navvy's pick, and Fig. 5 is a transverse section of the same on the line *x x* of Fig. 4.

Throughout the drawings like letters of reference indicate similar parts.

*a* is the working point, (which varies in size and shape in different tools,) and *b* is the shank thereof, which is provided with an inclined or wedge surface *c* and a heel or projection *d* at its rear end. On one or more sides of the base of the working point is a projection *d'*.

*e* is the socket in the pick in which the shank *b* is inserted and is held in engagement therein by the projection *d*, which drops or fits into a hole *f* near the end of the pick, and by the projection (or projections) *d'*, entering a notch or recess *g* (or notches or recesses) in the end of the said socket. The thickness of the shank through the heel part is preferably equal to that at its base or root, so that the said heel may be as large as possible consistent with the shank entering the socket *e*, and thus insuring greater strength.

*h* is one of the locking-rods which passes through a passage *i*, formed for its reception in the pick, and is pressed forward from the eye *j* of the pick, so that its inclined or tapered end *k* jams or wedges against the surface *c* of the shank *b*. A nut *l*, having a saw-gate, or its equivalent, for enabling it to be screwed on the threaded end of the rod *h*, fits in a recess in the eye of the pick and, when the shaft or handle *m* is inserted in the eye, forms an abutment therefor, whereby the various parts are held firmly in position, and also serves as a stop and prevents risk of breaking the pick by reason of the locking-rod being forced too far forward. The firmness of the point is further insured by the use of the projections *d'*, although I may in some cases dispense with them.

It is obvious that instead of the projections or heels *d* taking into holes or slots *f* other means may be employed for preventing the shanks becoming loose or working in the sockets, such, for example, as set-screws or a taper-pin driven through the shanks and sockets.

In the modification shown in Figs. 4 and 5 I provide a groove or channel *n* in the under or inner side of the prong or blade of the pick to receive the rod *h*, which in this case is conveniently of square section, although it may be round, angular, or of any other suitable section. This rod is secured in position in a manner similar to the rod hereinbefore mentioned. The nuts *l* may be flanged and be advantageously fitted in recesses in the edge of the pick.

Having now described my invention, I claim and desire to secure by Letters Patent—

1. In a pick, or like tool, the combination of a prong having a passage extending along its whole length, a locking-rod arranged in said passage and having one end wedge-shaped and the other end provided with an adjusting-nut, against which the handle of the pick abuts, and a removable point with a wedge-shaped shank, corresponding to the wedge-shaped end of the locking-rod, substantially as described.

2. In a pick, the combination of a removable point having a wedge-shaped shank, a heel or projection at the end of said shank, a socket in the pick-prong to receive the shank, and a hole to receive the heel or projection thereon, a locking-rod for wedging or jamming the shank tightly in place in the socket and extending to the eye of the pick, and a nut on the eye end of said rod against which the shaft or handle of the pick bears, substantially as described.

3. In a pick, or like tool, a removable point $a$ having a shank $b$ provided with an inclined or wedge surface $c$, a heel or projection $d$, on the opposite side of the shank to the wedge-surface and projections $d'$ at the base of the head of the point to insure stability in combination with a locking-rod $h$ having an inclined or tapered end $k$, substantially as and for the purpose described.

In witness whereof I have hereunto signed my name, in the presence of two subscribing witnesses, this 24th day of June, 1896.

JOHN BARLOW.

Witnesses:
E. D. HEARN, Jun.,
THOS. H. COOK.